(12) United States Patent
Choi et al.

(10) Patent No.: US 11,566,951 B2
(45) Date of Patent: Jan. 31, 2023

(54) DEFORMABLE BODY FOR FORCE/TORQUE SENSOR AND SENSOR

(71) Applicants: Research & Business Foundation Sungkyunkwan University, Suwon-si (KR); Aidin Robotics Co., Ltd., Suwon-si (KR)

(72) Inventors: Hyouk Ryeol Choi, Gunpo-si (KR); Dong Yeop Seok, Suwon-si (KR); Yong Bum Kim, Suwon-si (KR); Seung Yeon Lee, Suwon-si (KR); Jea Yun Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 63 days.

(21) Appl. No.: 17/226,501

(22) Filed: Apr. 9, 2021

(65) Prior Publication Data
US 2021/0318187 A1    Oct. 14, 2021

(30) Foreign Application Priority Data
Apr. 9, 2020 (KR) .................. 10-2020-0043222

(51) Int. Cl.
*G01L 1/14* (2006.01)

(52) U.S. Cl.
CPC .................. *G01L 1/142* (2013.01)

(58) Field of Classification Search
CPC ....... G01L 1/142; G01L 3/1442; G01L 5/165; G01L 1/14; G01L 3/00
USPC ..................................... 73/862.626
See application file for complete search history.

(56) References Cited

U.S. PATENT DOCUMENTS

2015/0292969 A1* 10/2015 Lee et al. ............. G01L 3/106
73/862.041
2018/0274995 A1* 9/2018 Choi ...................... G01L 1/142

FOREIGN PATENT DOCUMENTS

| JP | 4703526 B2 | * | 6/2011 |
|---|---|---|---|
| KR | 10-1477120 B1 | | 12/2014 |
| KR | 200478012 | * | 8/2015 |
| KR | 20170080903 A | * | 7/2017 |

* cited by examiner

*Primary Examiner* — Octavia Davis Hollington
(74) *Attorney, Agent, or Firm* — NSIP Law

(57) ABSTRACT

A deformable body for a force/torque sensor which may be attached to robots formed with multiple axes and multiple joints includes a substrate in which a hole is formed, a disc disposed above the hole, and a plurality of hinges protruding from a side surface of the disc and connecting the disc and the substrate.

18 Claims, 15 Drawing Sheets

DEFORMABLE BODY FOR FORCE/TORQUE SENSOR AND SENSOR

CROSS-REFERENCE TO RELATED APPLICATION

This application claims priority to and the benefit of Korean Patent Application No. 10-2020-0043222, filed on Apr. 9, 2020, the disclosure of which is incorporated herein by reference in its entirety.

BACKGROUND

1. Field of the Invention

The present invention relates to a deformable body for a force/torque sensor and a sensor using the same. More specifically, the present invention relates to a deformable body for a force/torque sensor, which is manufactured through simple machining and has a multi-axis reactive property and of which a structure is not limited, and a sensor using the same.

2. Discussion of Related Art

Force/torque sensors are essential core elements which are attached to robots formed with multiple axes and multiple joints, allow operations such as assembly and collaboration with people which are impossible with conventional position control to be performed, and improve reliability and accuracy of systems.

However, even with this necessity, the reason why the force/torque sensors may not be widely applied is a high price.

A plurality of force/torque sensors developed now are resistance type sensors, and processes of bonding strain gages should be performed for the plurality of force/torque sensors, and difficulties due to the processes are causes of the high supply price of the force/torque sensors.

Accordingly, capacitive sensors are being developed and can be applied to real robots, but there is a disappointment in terms of performance because the capacitive sensors have low resolutions or lack of rigidity when compared to the existing resistance type sensors.

In addition, since the force/torque sensor converts a force to a displacement using a deformable body to realize a multi-axis reactivity, and since a structure of the deformable body is very complex, three-dimensional (3D) machining is required or additional machining such as wire-cut machining is required, and thus a cost is high and casting is impossible, thereby becoming a main reason for increasing a price of the sensor.

Specifically, structures of deformable bodies used in conventional force/torque sensors are illustrated in FIGS. 1A to 1E. In FIGS. 1A and 1D, structures of deformable bodies mainly used in multi-axis force/torque sensors are illustrated, and in FIGS. 1B, 1C, and 1D, structures of deformable bodies mainly used in torques sensors are illustrated.

Among them, since machining such as wire-cut machining is required for the deformable bodies of FIGS. 1A and 1C, and a 3D machining is required for the deformable bodies of FIGS. 1D and 1E, costs thereof are high. The deformable body illustrated in FIG. 1B is relatively cheap but cannot be used in a torque sensor because of low decoupling performance.

RELATED ART DOCUMENT

Patent Document (Patent Document 1) Korean Patent No. 1477120, "CAPACITIVE 6-AXIAL FORCE/TORQUE SENSOR"

SUMMARY OF THE INVENTION

The present invention is directed to providing a sensor with a cheap price and high performance.

The present invention is also directed to providing a deformable body for a force/torque sensor capable of being manufactured through a simple machining.

The present invention is also directed to providing a deformable body for a force/torque sensor of which a multi-axis reactivity is easily controllable.

The present invention is also directed to providing a deformable body for a force/torque sensor capable of being easily customized and manufactured to have various structures.

The present invention is also directed to providing a deformable body for a force/torque sensor of which an inner space may be effectively used.

The present invention is also directed to providing a sensor with a simple structure which may have high performance.

The present invention is also directed to providing a sensor with a small thickness.

The above-described and other objectives of the present invention will be achieved by a deformable body for a force/torque sensor and a sensor according to the present invention.

According to an aspect of the present invention, there is provided a deformable body including a substrate in which a hole is formed, a disc disposed above the hole, and a plurality of hinges protruding from a side surface of the disc and connecting the disc and the substrate.

The disc may have an annular shape.

The disc may be concentric with the hole and have an outer diameter which is the same as a diameter of the hole, and the hinge may have a "1"-shaped column shape connecting the disc and the substrate.

The disc may be concentric with the hole and have an outer diameter smaller than a diameter of the hole, and the hinge may have a "L" shape including a vertical portion vertically extending in a direction from the substrate toward the disc and a horizontal portion horizontally extending in a direction from the vertical portion toward the side surface of the disc.

A width of the horizontal portion may be greater than a width of the vertical portion.

The substrate may have a cup shape, and an upper surface of the disc may be positioned to be coplanar with an upper surface of the substrate.

An upper surface of the hinge may be positioned to be coplanar with an upper surface of the disc.

A height of the horizontal portion of the hinge may be the same as a height of the disc.

According to another aspect of the present invention, there is provided a sensor including the deformable body according to the aspect of the present invention.

The sensor according to another aspect of the present invention may further include a sensing printed circuit board (PCB) positioned on an upper surface of the substrate of the deformable body and including a sensing electrode, and an upper plate positioned above the sensing PCB and coupled to the disc of the deformable body.

The upper plate may include a corresponding electrode facing the sensing electrode.

The sensing electrode may be positioned on an upper surface of the sensing PCB, and the corresponding electrode may include an inclined surface which is inclined with respect to the sensing electrode.

The corresponding electrode may include a vertical surface facing a side surface of the sensing PCB.

The sensing electrode may extend to a side surface of the sensing PCB.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
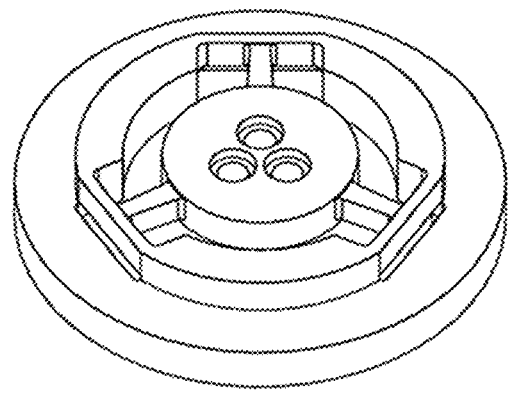
FIGS. 1A to 1E are a set of views illustrating conventional deformable bodies.
Figure 1B:
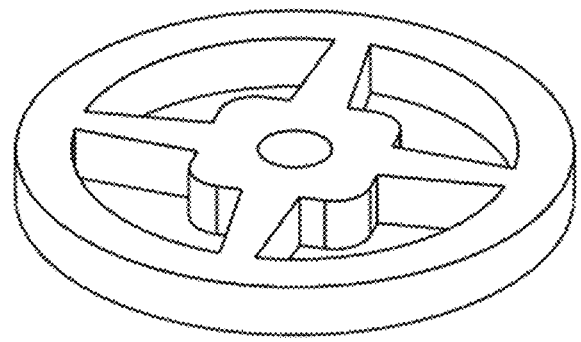
Figure 1C:
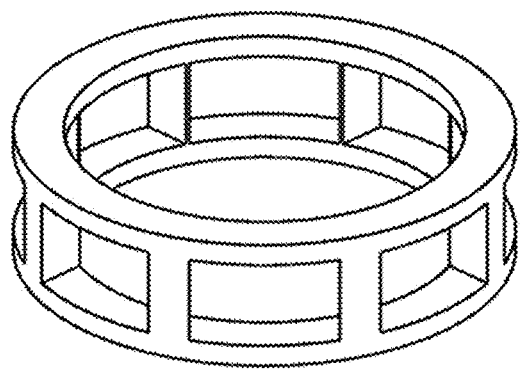
Figure 1D:
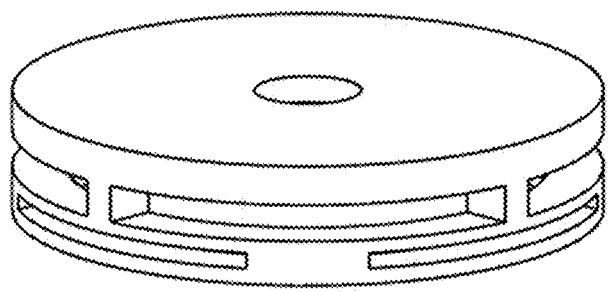
Figure 1E:
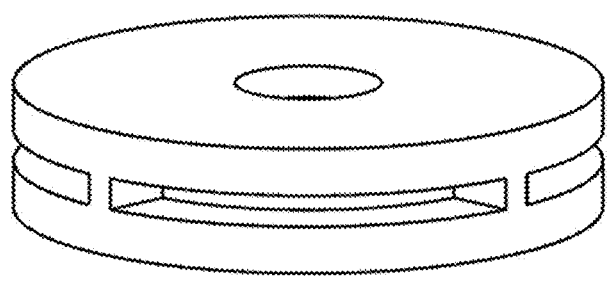

Hereinafter, a deformable body for a force/torque sensor and a sensor according to the present invention will be described in detail with reference to the accompanying drawings.

In the following description, only portions needed to understand the deformable body for a force/torque sensor and a sensor according to the embodiment of the present invention will be described, and the other portions may be omitted in order to not obscure the gist of the present invention.

In addition, terms and words used in this specification and claims are not interpreted as limited to commonly used meanings or meanings in dictionaries and should be interpreted as having meanings and concepts which are consistent with the technological scope of the present invention in order to describe the present invention in the most appropriate way.

Throughout the specification, when a portion "includes" an element, another element may be further included, rather than excluding the existence of the other element, unless otherwise described. Moreover, terms described in the specification such as "~ part," "~ device," and "~ module," refer to a unit of processing at least one function or operation and may be implemented as hardware or software or a combination thereof.

In the various embodiments, the same components will be denoted by the same reference numerals and described in one embodiment representatively, and other components will be described in the other embodiments.

Figure 2:
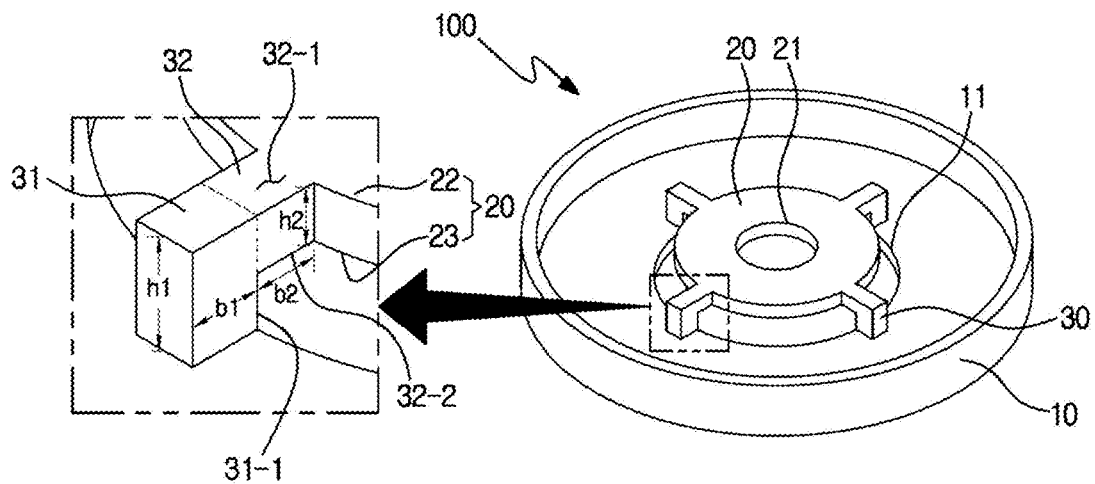
FIG. 2 is a perspective view illustrating a deformable body according to one embodiment of the present invention.

FIG. 2 is a perspective view illustrating a deformable body 100 according to one embodiment of the present invention.

As illustrated in FIG. 2, the deformable body 100 according to one embodiment of the present invention includes a substrate 10, a disc 20, and hinges 30.

The substrate 10 is a portion which is a base of the deformable body 100 according to one embodiment of the present invention, and a hole 11 is formed in the substrate. The hole 11 is formed in the substrate 10 to form the disc 20 through a simple cutting machining method or a casting method, and a size of the hole is greater than or equal to a size of the disc.

As illustrated in FIG. 2, the substrate 10 may have a flat plate shape or a cup shape having an inner space. In this case, the inner space of the substrate having the cup shape may be effectively used to position a sensing printed circuit board (PCB) and an upper plate when a sensor is manufactured using the deformable body 100 according to one embodiment of the present invention.

In addition, when the substrate 10 has the cup shape, an upper surface 12 thereof may be coplanar with an upper surface 22 of the disc 20.

The disc 20 is positioned above the hole 11 of the substrate 10, and in a sensor 1 according to one embodiment of the present invention, the disc 20 is coupled to an object, to which an external force is applied, along with an upper plate 300 and moves relatively with respect to the substrate 10 coupled thereto by the hinges 30.

The disc 20 is concentric with the hole 11 of the substrate and may be manufactured to have the size which is smaller than or equal to the size of the hole 11 according to use of the sensor (for example, a torque sensor or 6-axis force/torque sensor.

As illustrated in FIG. 2, the disc 20 may have an annular shape in which the hole 21 is formed at a center thereof but does not necessarily need to have the annular shape.

The hinges 30 connect the substrate 10 and the disc 20 and are elastically deformable so that the disc 20 is relatively moveable with respect to the substrate 10.

Specifically, the hinge 30 includes a vertical portion 31 vertically extending in a direction from the substrate 10 toward the disc 20 and a horizontal portion 32 laterally extending in a direction from the vertical portion toward a side surface of the disc.

In a state in which an inner side surface 31-1 is in contact with the hole 11 of the substrate 10, the vertical portion 31 vertically extends in the direction toward the disc 20, and a height (thickness) of the horizontal portion 32 is the same as a height (thickness) of the disc 20. That is, an upper surface 32-1 of the horizontal portion is coplanar with the upper surface 22 of the disc 20, and a lower surface 32-2 of the horizontal portion is coplanar with a lower surface 23 of the disc 20.

In addition, a height and a width of the vertical portion and a height and a width of the horizontal portion act as variables for a multi-axis reactivity of the deformable body 100 according to one embodiment of the present invention.

Figure 3A:
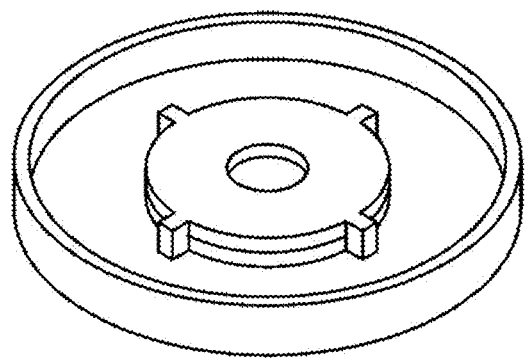
FIGS. 3A to 3C and 4A to 4D are sets of views illustrating various modified examples of the deformable body according to one embodiment of the present invention.
Figure 3B:
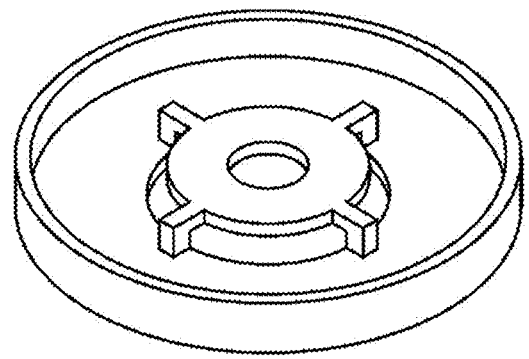

For example, from a basic form of FIG. 3B, a width $b_2$ of the horizontal portion 32 may be reduced so that the hinge 30 may be changed to have only the vertical portion 31 so as to have a "1"-shaped column shape. In this case, since the deformable body 100 is strong against a force and a moment but is sensitive only to a torque, the deformable body 100 is advantageous in decoupling, and thus the deformable body becomes suitable for the torque sensor.

Figure 3C:
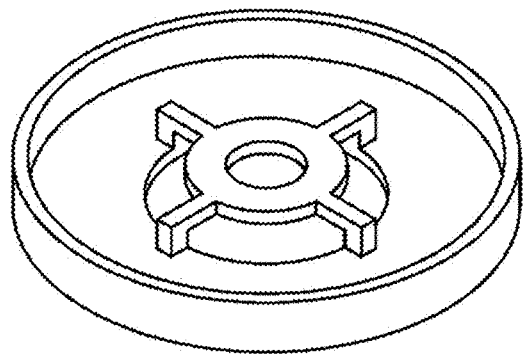
Figure 4A:
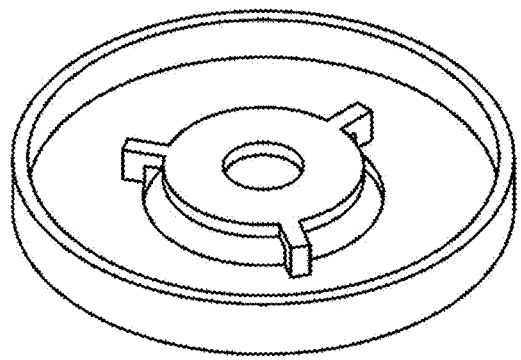
Figure 4B:
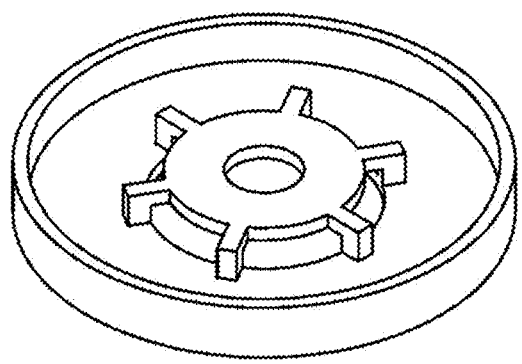
Figure 4C:
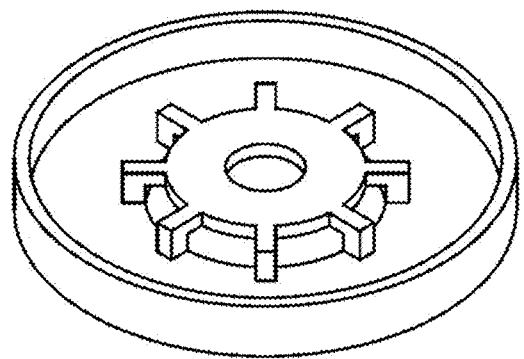
Figure 4D:
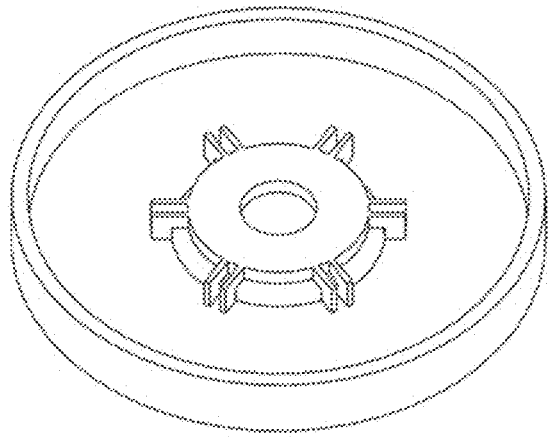

In addition, from the basic form of FIG. 3B, the width $b_2$ of the horizontal portion 32 may be increased so that the width of the horizontal portion is changed to be longer than the width of the vertical portion as illustrated in FIG. 3C. In this case, since the deformable body 100 reacts to both of a force and a torque, the deformable body becomes useful for a 6-axis sensor.

As illustrated in FIGS. 2 and 4, the number of the hinges 30 of the deformable body 100 according to one embodiment of the present invention may be properly adjusted according to a requirement of a user, and the plurality of hinges may have the same shape and may be spaced apart from each other at the same angular intervals for the deformable body to not deform in one direction.

In the deformable body 100 according to one embodiment of the present invention, the multi-axis reactivity is easily controllable, customizing is facilitated, one of various structures may be formed, the inner space is efficiently useable, and particularly, manufacturing thereof is possible through two-dimensional simple machining so that a manufacturing cost may be significantly reduced.

Hereinafter, a method of manufacturing the deformable body 100 according to one embodiment of the present invention will be described in detail.

Figure 5:
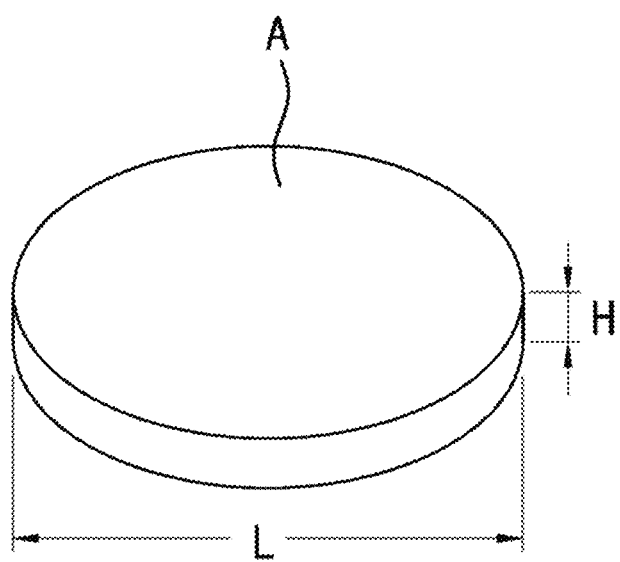
FIG. 5 is a perspective view illustrating a raw material for manufacturing the deformable body according to one embodiment of the present invention.

As illustrated in FIGS. 2 and 5, a raw material A for manufacturing the deformable body 100 according to one embodiment of the present invention is prepared (S100).

The raw material A is a material which becomes the deformable body 100 and is the same as a material of the deformable body. Since a diameter L and a height H of the raw material may become a diameter and a height of the deformable body and a diameter and a height of the sensor according to one embodiment of the present invention, the raw material having a corresponding size is prepared.

Figure 6A:
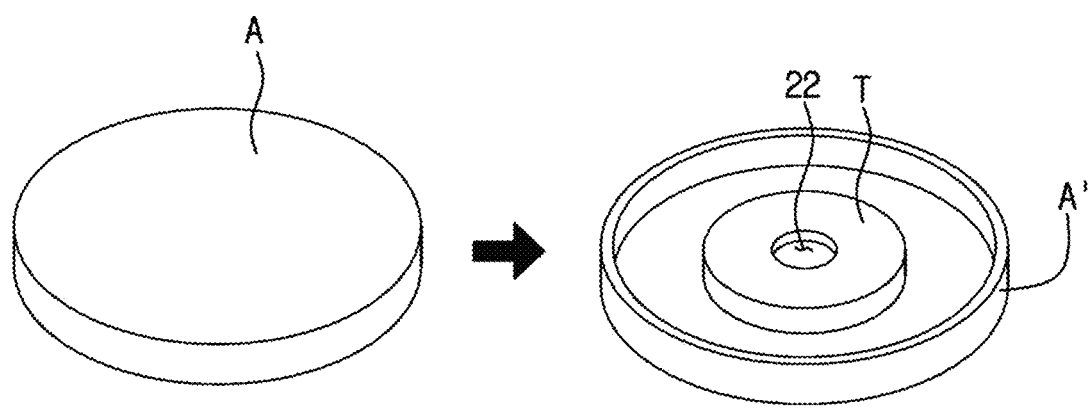
FIGS. 6A to 6B are a view illustrating a change in form of the raw material when a first cutting process is performed.
Figure 6B:
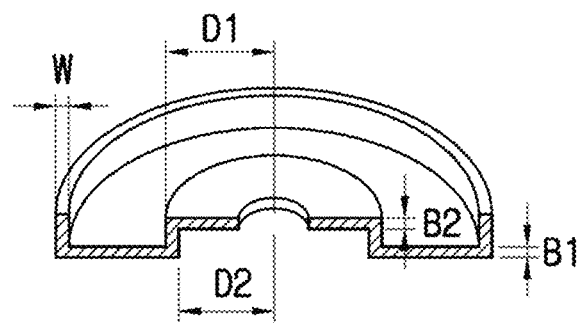

Next, as illustrated in FIGS. 2 and 6, a first cutting process (S200) is performed on an upper surface and a lower surface of the raw material A to form a basic frame of the deformable body.

The first cutting process includes a downward cutting process (S210) performed in a direction from the upper surface toward the lower surface of the raw material A and an upward cutting process (S220) performed in a direction from the lower surface toward the upper surface of the raw material A.

The downward cutting process (S210) is a cutting process for forming the inner space of the substrate of the deformable body, and a portion of the raw material A is cut in a width direction except a circular region of which a radius D1 is the same as a distance from a center thereof to an outer side surface 31-2 of the hinge 30. In a case in which the substrate 10 is formed in the cup shape, a portion of the raw material A is cut so that a remaining thickness from a side surface thereof is a wall thickness W of the substrate 10 having the cup shape. In addition, in the downward cutting processing (S210), a portion of the raw material A is cut in a depth direction from the upper surface toward the lower surface so that a remaining thickness from the lower surface is the same as a bottom thickness B1 of the substrate.

Next, the upward cutting process (S220) is a cutting process for forming the hole 11 of the substrate, and a circular region, of which a radius D2 is the same as a distance from the center thereof to the inner side surface 31-1 of the hinge 30, of the raw material A is cut in the width direction. In addition, in the upward cutting process (S220), the raw material is cut in the depth direction from the lower surface toward the upper surface thereof so that a remaining thickness thereof is a thickness B2 of the disc 20 from the upper surface. In a case in which the disc 20 is formed in an annular shape, the raw material is cut without remaining a portion of the hole 21.

A raw material A' on which the first cutting process is completely performed has a form in which a convex protrusion T is formed on a central portion of the substrate 10 as illustrated in FIGS. 2 and 6.

Next, a second cutting process (S300) is performed in which the disc 20 and the hinges 30 are completely formed by cutting the protrusion T of the raw material A' on which the first cutting process is completely performed.

Figure 7A:
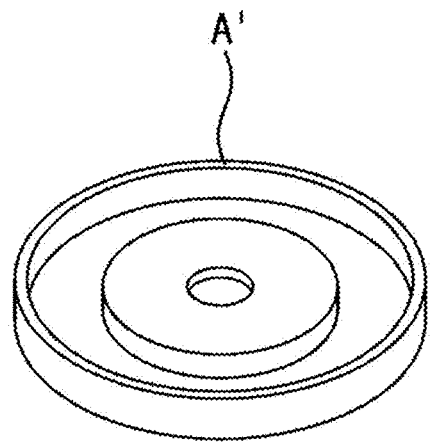
FIGS. 7A to 7C are a view illustrating a change in the form of the raw material when a second cutting process is performed.
Figure 7B:
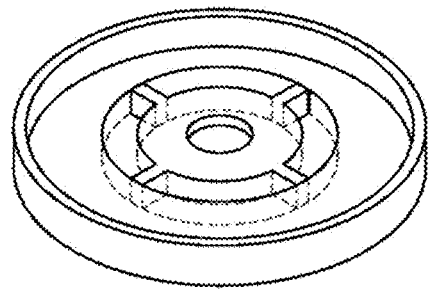
Figure 7C:
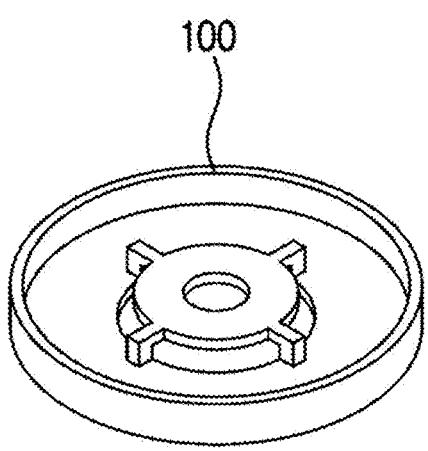

As illustrated in FIGS. 2 and 7, in the second cutting process, a portion of the protrusion T is removed except a region which becomes the disc 20 and the hinges 30.

In the second cutting process, as the disc 20 is formed to have a larger diameter, the deformable body becomes more suitable for a torque sensor, and as the disc 20 is formed to have a smaller diameter, the deformable body becomes more suitable for a 6-axis force/torque sensor.

As described above, since the deformable body 100 according to one embodiment of the present invention may be completely formed by only cutting the raw material A two-dimensionally (upward and downward), the machining for the deformable body 100 is simple when compared to the conventional three-dimensional machining so that a machining cost is reduced. In addition, since the form of the deformable body is simple, the deformable body is also manufacturable through a casting method.

Figure 8A:
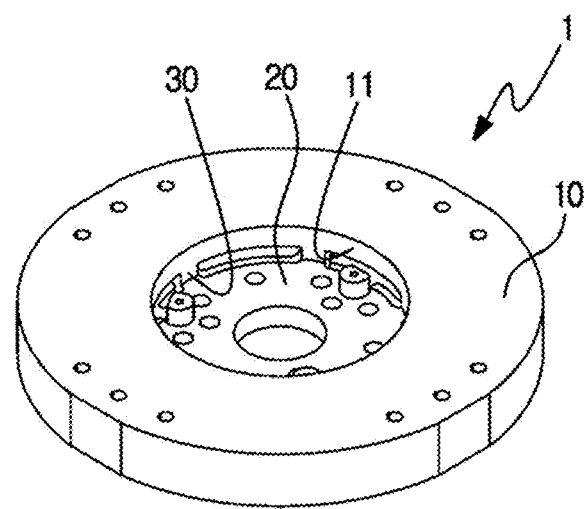
FIGS. 8A to 8B are a set of views illustrating a sensor according to one embodiment of the present invention.

In FIGS. 2 and 8, the sensor 1 manufactured using the deformable body according to one embodiment of the present invention is illustrated. FIG. 8A is a perspective view showing a bottom surface of the sensor 1 and shows the substrate 10, in which the hole 11 of the deformable body 100 according to one embodiment of the present invention is formed, and a portion of the disc 20 and a portion of the hinge 30 shown through the hole 11.

Figure 8B:
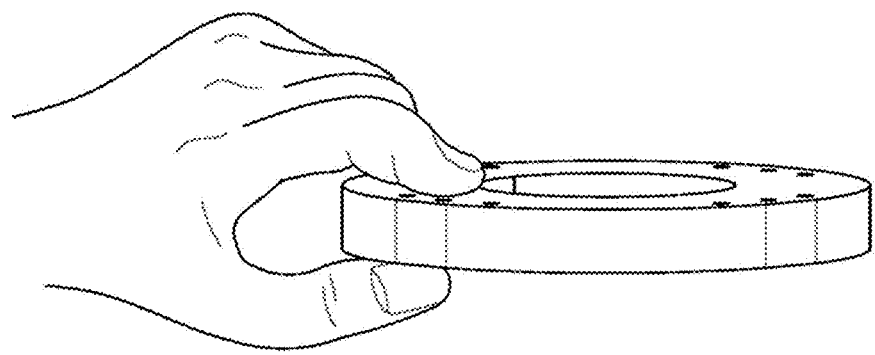

The sensor 1 formed as described above according to one embodiment of the present invention may be formed to be very thin and small as illustrated in FIG. 8B.

The sensor 1 according to one embodiment of the present invention will be described in more detail. The sensor 1 according to one embodiment of the present invention includes the deformable body 100, a sensing PCB 200, and the upper plate 300.

Figure 9A:
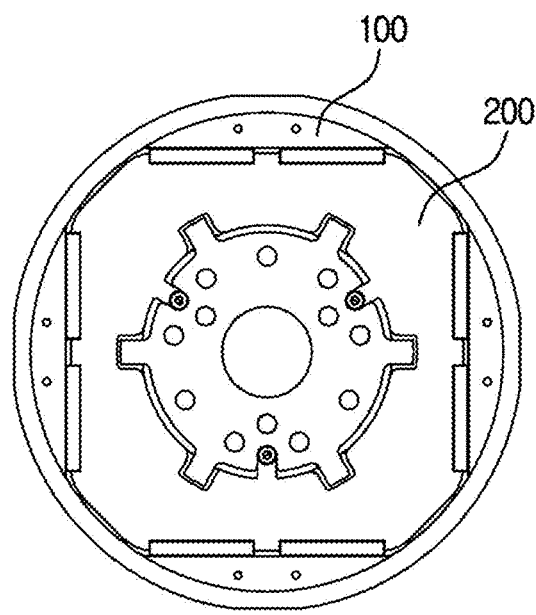
FIGS. 9A to 9B are a set of views illustrating an assembly process of the sensor according to one embodiment of the present invention.
Figure 9B:
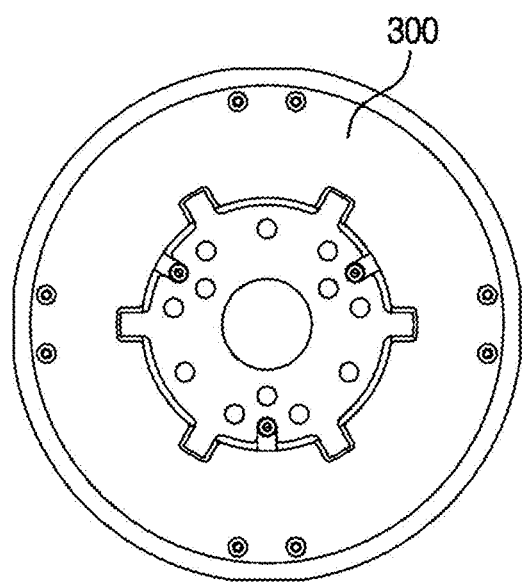

As illustrated in FIGS. 2 and 9, the sensor 1 according to one embodiment of the present invention is assembled by positioning the sensing PCB 200 in an inner space of the deformable body 100 (that is, on an upper surface of the substrate 10) and covering the sensing PCB 200 using the upper plate 300.

Figure 10A:
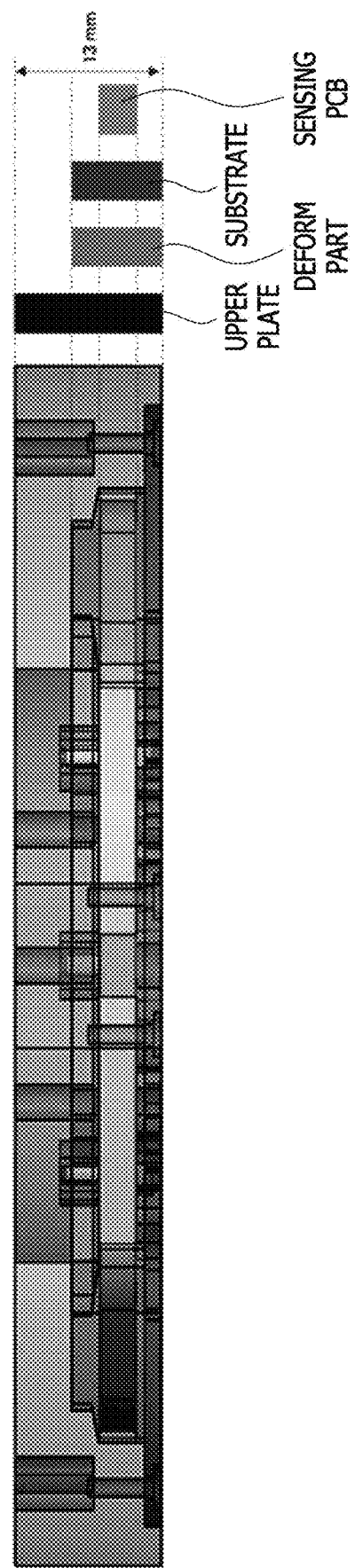
FIGS. 10A to 10B are a view illustrating comparison between a cross section of the sensor according to one embodiment of the present invention and a cross section of a conventional sensor.
Figure 10B:
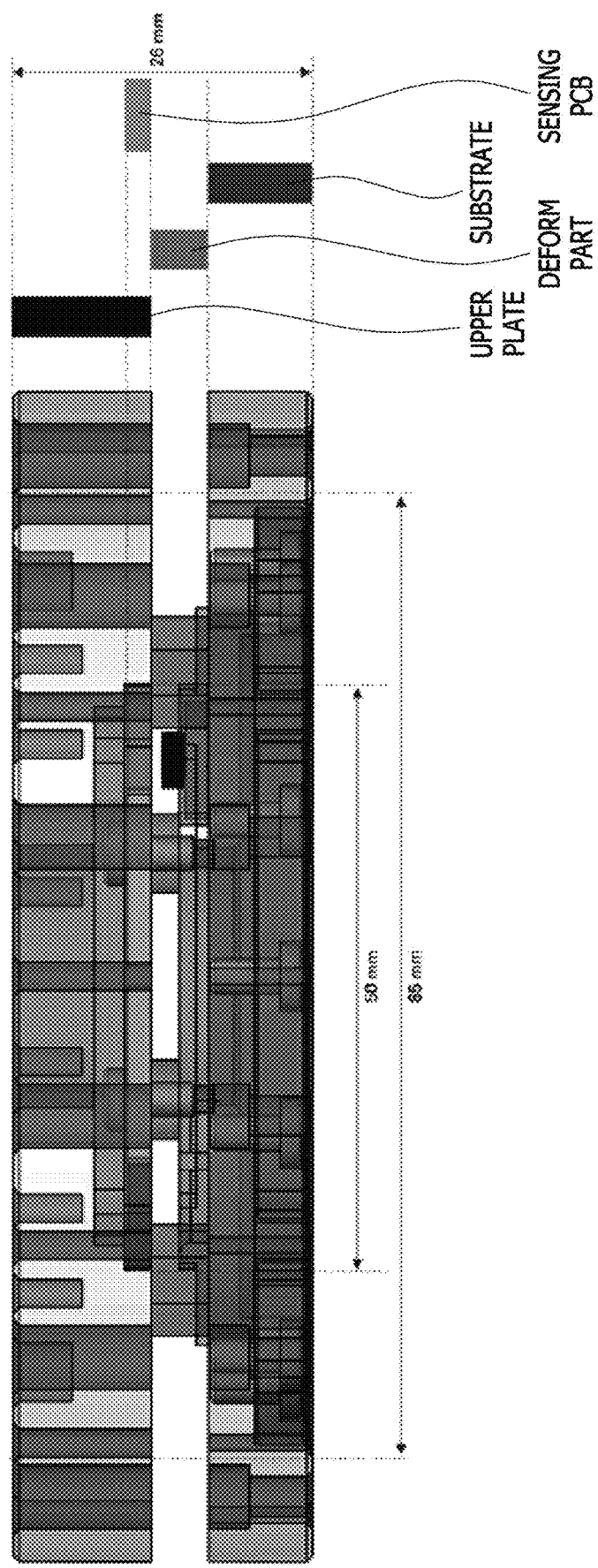

As seen from FIG. 10A, in the sensor 1 according to one embodiment of the present invention using the deformable body 100 according to one embodiment of the present invention, all of the substrate 10, the deformable body 100, and the upper plate 300 may overlap in a height direction so that the sensor may be formed to have a thickness which is significantly thinner than the conventional sensor as illustrated in FIG. 10B.

In the sensor 1 according to one embodiment of the present invention, the upper plate 300 is a portion coupled to an object to which an external force is applied, and the object is also coupled to the disc 20 of the deformable body 100. Accordingly, when the external force is applied to the object, the upper plate 300 and the disc are moved as the external force is applied thereto.

Meanwhile, since the disc 20 is relatively moveable due to the hinge 30 with respect to the substrate 10 of the deformable body, even when the upper plate 300 and the disc 20 are moved when the external force is applied to the object, the substrate 10 and the sensing PCB 200 may not be moved, and movement of the upper plate may be detected to detect the external force applied to the object.

To this end, as seen from FIG. 9, sensing electrodes 210 for detecting the external force are provided at corners of the sensing PCB, a capacitance is generated between the sensing electrode 210 and a corresponding electrode 310 of the upper plate 300 which faces the sensing electrode 210, and thus the sensor 1 according to one embodiment of the present invention may detect the external force (force, torque, or the like) applied to the object using a change in capacitance detected by sensors.

A method of measuring a change in capacitance according to the external force will be described below in more detail with reference to FIGS. 11 to 13 which show the sensing electrode 210 and the corresponding electrode 310 of the sensor 1 according to one embodiment of the present invention.

The capacitance C is generated between two electrodes which face each other with a dielectric disposed therebetween, is proportional to an area A between two electrodes, and is inversely proportional to a distance d between the two electrodes as shown by an equation below.

$$C = \varepsilon A/d \text{ (Here, } \varepsilon \text{ is a dielectric constant of a dielectric.)}$$

According to the equation, the capacitance is greatly affected by the distance between the two electrodes when compared to the area between the two facing electrodes.

Figure 12A:
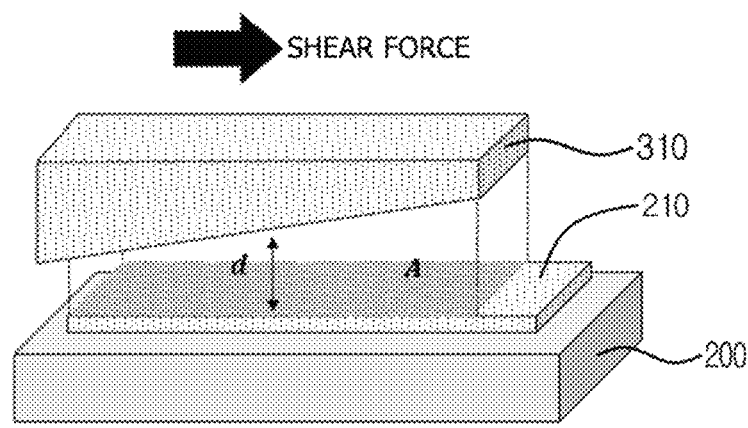
FIGS. 12A to 12B are a set of views illustrating an example form of the corresponding electrode allowing a distance between the sensing electrode and the corresponding electrode to be changed even when a shear force is applied thereto.
Figure 12B:
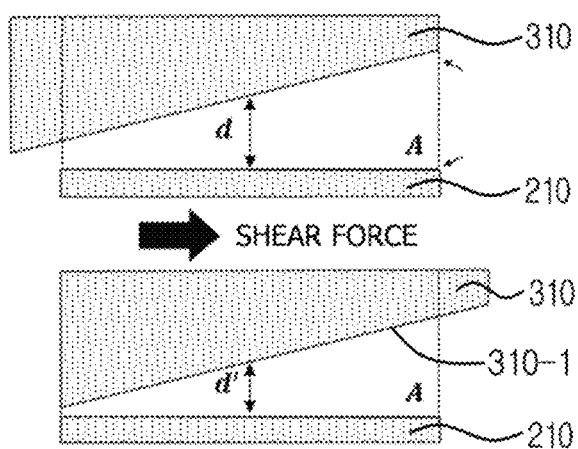

Accordingly, as illustrated in FIGS. 12A and 12B, in the sensor 1 according to one embodiment of the present invention, the corresponding electrode 310 facing the sensing electrode 210 has an inclined surface 310-1 which is inclined with respect to the sensing electrode. To this end, as illustrated in FIGS. 12A and 12B, a wedge-shaped electrode may be used as the corresponding electrode, or alternatively, a wedge-shaped electrode may be provided as the sensing electrode.

When the sensing electrode and the corresponding electrode are disposed to be inclined to each other without being disposed to be parallel, as shown in FIG. 12B, the distance between the two electrodes is changeable when a shear force is applied thereto. Accordingly, since a large change in capacitance may occur when compared to a case in which a change in capacitance occurs due to a change in overlapping area occurring due to the shear force, even when a small force is applied thereto, the force may be easily sensed.

Figure 13:
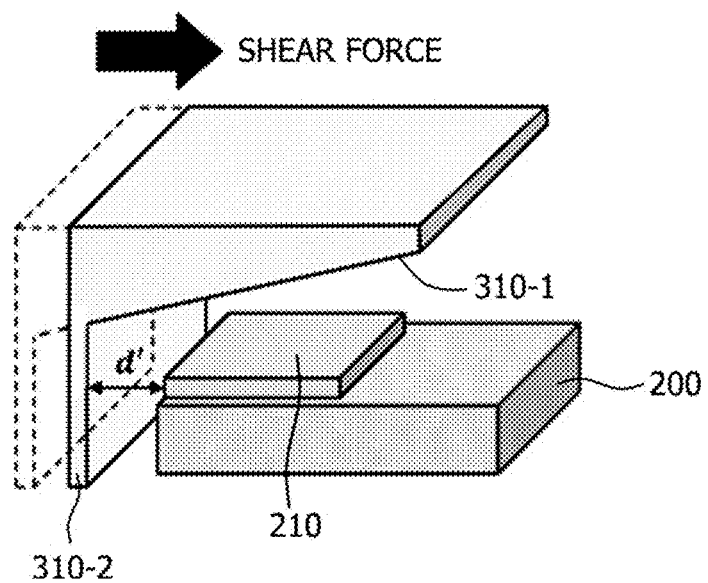
FIG. 13 is a view illustrating a modified example of the corresponding electrode allowing a larger change in capacitance to occur in a case in which a shear force is applied thereto.

In addition, as illustrated in FIG. 13, in a case in which the corresponding electrode 310 includes a vertical surface 310-2 extending to a side surface of the sensing PCB, since a capacitance between the sensing electrode 210 and the vertical surface 310-2 increases when the shear force is applied, a larger change in capacitance may occur.

Figure 11:
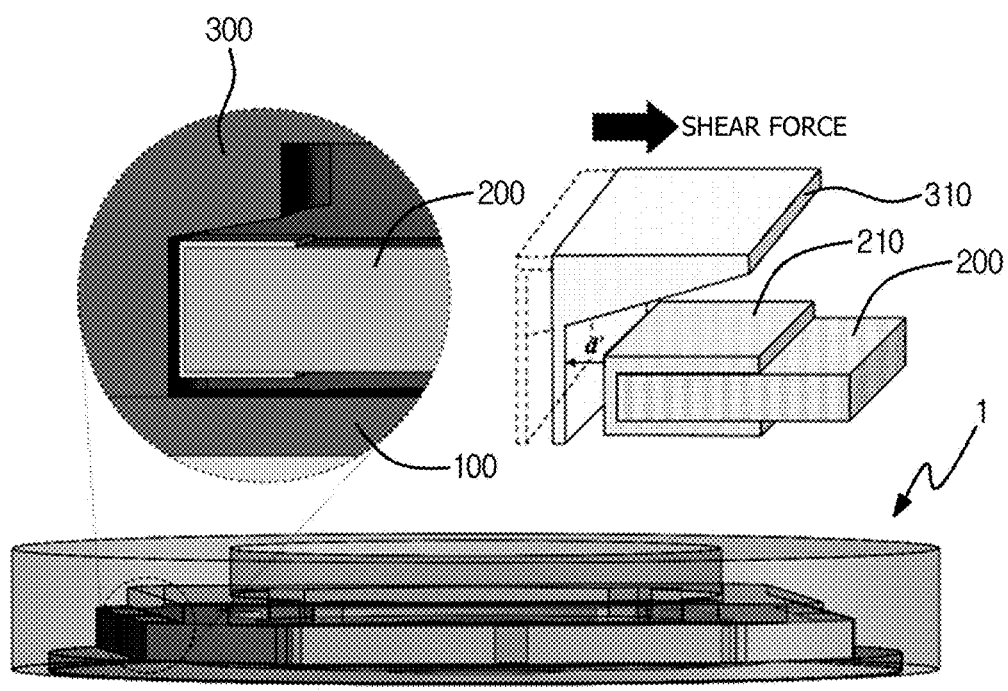
FIG. 11 is a view illustrating a sensing electrode and a corresponding electrode of the sensor according to one embodiment of the present invention.

In addition, as illustrated in FIG. 11, the sensing electrode 210 may extend to the side surface of the sensing PCB 200 to increase the change in capacitance.

According to the present invention, there is an effect of providing a deformable body for a force/torque sensor which can be manufactured through a simple machining, can easily control a multi-axis reactivity, can be easily customized, can be manufactured to have various structures, and allows an inner space to be effectively used.

There is an effect of providing a sensor of which price competitiveness is high and the thickness is small by using the deformable body which can be manufactured through a simple machining.

There is an effect of providing a sensor with a simple structure which obtains high performance.

The deformable body for a force/torque sensor and the sensor according to the embodiment of the present invention have been limitedly described above with reference to the specific embodiment. However, it should be understood that the present invention is not limited to the specific embodiment, and various modifications and changes may be made without departing from the spirit and scope of the present invention defined by the appended claims.

What is claimed is:

1. A sensor, comprising:
   a deformable body comprising a substrate in which a hole is formed, a disc disposed above the hole, and a plurality of hinges protruding from a side surface of the disc and connecting the disc and the substrate;
   a sensing printed circuit board (PCB) positioned on an upper surface of the substrate of the deformable body and including a sensing electrode; and
   an upper plate positioned above the sensing PCB and coupled to the disc of the deformable body,
   wherein the upper plate includes a corresponding electrode facing the sensing electrode.

2. The sensor of claim 1, wherein the disc has an annular shape.

3. The sensor of claim 1, wherein:
   the disc is concentric with the hole and has an outer diameter which is the same as a diameter of the hole; and
   each hinge has a "1"-shaped column shape connecting the disc and the substrate.

4. The sensor of claim 1, wherein:
   the disc is concentric with the hole and has an outer diameter smaller than a diameter of the hole; and
   each hinge has a "L" shape including a vertical portion vertically extending in a direction from the substrate toward the disc and a horizontal portion horizontally extending in a direction from the vertical portion toward the side surface of the disc.

5. The sensor of claim 4, wherein a width of the horizontal portion is greater than a width of the vertical portion.

6. The sensor of claim 1, wherein:
   the substrate has a cup shape; and
   an upper surface of the disc is positioned to be coplanar with an upper surface of the substrate.

7. The sensor of claim 4, wherein a height of the horizontal portion of each hinge is the same as a height of the disc.

8. The sensor of claim 1, wherein an upper surface of each hinge is positioned to be coplanar with an upper surface of the disc.

9. A sensor, comprising:
a deformable body comprising a substrate in which a hole is formed, a disc disposed above the hole, and a plurality of hinges protruding from a side surface of the disc and connecting the disc and the substrate;
a sensing printed circuit board (PCB) positioned on an upper surface of the substrate of the deformable body and including a sensing electrode; and
an upper plate positioned above the sensing PCB and coupled to the disc of the deformable body,
wherein:
the upper plate includes a corresponding electrode facing the sensing electrode;
the sensing electrode is positioned on an upper surface of the sensing PCB; and
the corresponding electrode includes an inclined surface which is inclined with respect to the sensing electrode.

10. The sensor of claim 9, wherein the corresponding electrode includes a vertical surface facing a side surface of the sensing PCB.

11. The sensor of claim 10, wherein the sensing electrode extends to a side surface of the sensing PCB.

12. The sensor of claim 9, wherein the disc has an annular shape.

13. The sensor of claim 9, wherein:
the disc is concentric with the hole and has an outer diameter which is the same as a diameter of the hole; and
each hinge has a "1"-shaped column shape connecting the disc and the substrate.

14. The sensor of claim 9, wherein:
the disc is concentric with the hole and has an outer diameter smaller than a diameter of the hole; and
each hinge has a "L" shape including a vertical portion vertically extending in a direction from the substrate toward the disc and a horizontal portion horizontally extending in a direction from the vertical portion toward the side surface of the disc.

15. The sensor of claim 14, wherein a width of the horizontal portion is greater than a width of the vertical portion.

16. The sensor of claim 14, wherein a height of the horizontal portion of each hinge is the same as a height of the disc.

17. The sensor of claim 9, wherein:
the substrate has a cup shape; and
an upper surface of the disc is positioned to be coplanar with an upper surface of the substrate.

18. The sensor of claim 9, wherein an upper surface of each hinge is positioned to be coplanar with an upper surface of the disc.

* * * * *